(12) United States Patent
Ramos

(10) Patent No.: US 6,241,899 B1
(45) Date of Patent: Jun. 5, 2001

(54) DISPOSABLE FILTER BAGS FOR POOL CLEANERS

(76) Inventor: Maritza L. Ramos, 6223 Bayonne Dr., Spring, TX (US) 77389

(*) Notice: Subject to any disclaimer, the term of this patent is extended or adjusted under 35 U.S.C. 154(b) by 0 days.

(21) Appl. No.: 09/514,517

(22) Filed: Feb. 28, 2000

(51) Int. Cl.⁷ .............................. B01D 29/35; B01D 39/08
(52) U.S. Cl. ..................... 210/767; 210/169; 210/496; 210/504; 210/505; 210/508
(58) Field of Search ................. 210/169, 416.2, 210/490, 491, 496, 504, 505, 508, 767

(56) References Cited

U.S. PATENT DOCUMENTS

| | | | |
|---|---|---|---|
| 3,631,987 | * 1/1972 | Cattano, Sr. | 210/505 |
| 4,100,009 | * 7/1978 | Nakajima et al. | 210/508 |
| 4,160,059 | * 7/1979 | Samejima | 210/505 |
| 4,483,897 | 11/1984 | Fujimura et al. | 428/288 |
| 4,511,615 | 4/1985 | Ohta | 428/198 |
| 4,618,420 | 10/1986 | Alanis | 210/169 |
| 4,765,915 | * 8/1988 | Diehl | 210/505 |
| 4,814,033 | * 3/1989 | Spearman et al. | 210/504 |
| 4,880,531 | 11/1989 | Blake et al. | 210/169 |
| 5,202,020 | * 4/1993 | Desjoyaux et al. | 210/169 |
| 5,393,601 | * 2/1995 | Heinrich et al. | 210/508 |
| 5,503,745 | * 4/1996 | Ogata et al. | 210/504 |
| 5,665,235 | * 9/1997 | Gildersleeve et al. | 210/508 |
| 5,711,878 | * 1/1998 | Ogata et al. | 210/504 |
| 5,855,784 | * 1/1999 | Pike et al. | 210/508 |

\* cited by examiner

Primary Examiner—Christopher Upton
(74) Attorney, Agent, or Firm—Mary J. Gaskin

(57) ABSTRACT

An improved, disposable filter bag is provided for automatic and manual pool water filtering assemblies. The filter bag is formed from a water-permeable, non-woven fabric such as Pellon®. The seams can be formed by heat-fusing.

10 Claims, 2 Drawing Sheets

DISPOSABLE FILTER BAGS FOR POOL CLEANERS

FIELD OF THE INVENTION

The invention relates generally to improved filter bags for use with automatic and manual pool cleaning devices.

BACKGROUND OF THE INVENTION

Filtration systems are necessary to remove dirt and foreign matter from the water in swimming pools. Typically, filtration systems direct pool water through a filtering unit, which holds a porous filter bag for trapping any sediment and debris, while discharging the filtered water.

The filter bags used in filtering units are generally formed from a porous, nylon mesh material, which is cut and sewn into an appropriate bag shape, with an opening for attachment to the pool filter. Small particles of debris cannot be filtered out of the pool water by the mesh. Larger pieces of debris can attach to the stitching, thereby obstructing the flow of water out of the filter bag. Periodically the pool owner or operator must open the filter bag and remove the collected sediment and debris from the filter bag. Handling decaying debris, such as worms, dead bugs, and moldy leaves, can be unsanitary and unpleasant. The pool owner or operator must then clean the filter bag (or put a soiled one back on) before putting it back on the filtering unit. The cost of the filter bags presently being used dictates against replacing them with new ones until they are torn or worn out.

SUMMARY OF THE INVENTION

The present invention provides a disposable filter bag for use with automatic and manual pool cleaning devices. More specifically, the present invention relates to the materials used in forming such a filter bag, as well as the method of assembling the filter bag. The actual shape of the filter bag is not part of the invention.

The filter bag of the present invention, which is made from a porous, water-permeable, nonwoven material, is economical to produce. The nonwoven material can be coated with adhesive material so that the seams can be fused together instead of sewn. Because of the low cost, a pool owner or operator can remove and discard a filter bag when it has collected a sufficient amount of debris. The filter bag is durable and resistant to wear, permitting it to be installed and removed without the possibility of tearing. Presently, the material of choice for filter bags is nylon mesh, which is porous, but which is unable to filter very small particles of debris from pool water. The present invention uses materials with a fine web, resulting in superior filtering of small particles of debris, thereby improving pool water clarity. Unlike mesh, the material of the present invention is not susceptible to the growth of mold. The material of the present invention is low in cost, so that each filter bag can be disposed of and replaced after several months of normal use. No maintenance, either emptying or cleaning, is required. The material has some "give", so that it completely fills the filtering unit as it collects debris. Finally, the adhesive coating on the nonwoven material allows the seams and edges of the filter bags to be heat-fused, without sewing. As a result, the filter bag of the present invention can be made more inexpensively and more quickly than are sewn nylon mesh filter bags.

Other features and advantages of the present invention will become more apparent from the following detailed description.

BRIEF DESCRIPTION OF THE PREFERRED EMBODIMENT

Figure 1:
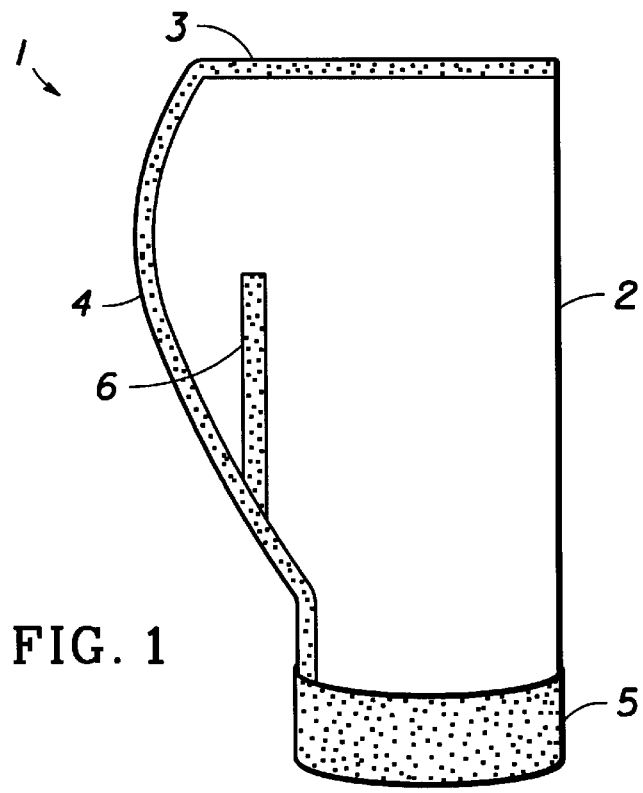
FIG. 1 is a side view of one embodiment of the filter bag of the present invention.

The present invention relates to a filter bag for mounting on a swimming pool filtering assembly. The filter bag 1 shown in FIG. 1 can be used with automatic pool filtering assemblies of the type shown and described in U.S. Pat. No. 3,822,754, for devices sold under the trademark POLARIS VAC-SWEEP. The filter bag 1 is formed from a pre-cut, pre-shaped width of porous, water-permeable, nonwoven material which is coated with a heat-melting adhesive. The width of material is folded upon itself at fold 2, and the top margins 3 and the side margins 4 are aligned. Heat is applied to the top margins 3 and the side margins 4, thereby melting the heat-melting adhesive and bonding the margins 3, 4 to create "seams". The resulting cylindrical shape defines the collecting portion of the filter bag 1. The bottom margin 5 has been turned under and fused onto itself to form a stiff, circular collar for mounting onto a pool filter (not shown). A dividing seam 6 can be formed by heat fusing, if desired. Alternatively, the seams can be formed by conventional means such as by sewing or by using VELCRO® fastening means, a loop and hook fastening system.

The preferred material used for making the filter bag is a non-woven fabric comprised of fibers formed into a web and bonded to each other with thermoplastic adhesive fibers. More specifically, the preferred material used in the present invention is known as PELLON®, a non-woven fabric having a surface coated with heat-melting adhesive. PELLON® has a web layer weighing 5 to 40 g/m.sup. 2, and contains 10–50% by weight of thermoplastic component fibers but at least 20° C. higher than that of the heat melting adhesive. Two web layers are bonded into one sheet of non-woven fabric by use of a heat treatment. The first web layer contains 10 to 40% by weight of thermoplastic bicomponent fiber mass constituting low melting-point component and high melting point component fibers for bonding of all fibers to each other. This thermoplastic bicomponent fiber may be of core-sheath type or joint type. Typically, a core-sheath type polyamide thermoplastic bicomponent fiber can be used wherein the temperature differential between the low and high softening temperature components is about 40° to 50° C. For example, a biocomponent fiber can be used in which the low softening point component is nylon-6 in the form of sheath having the softening point of about 215° C. Thermoplastic bicomponent fibers of olefin or polyester may also be used. Synthetic fibers including polyamide, polyester, and acrylic, regenerated fibers such as rayon, and natural fibers such as cotton, can be used as the fibers making up the remaining weight percentage in both the first and second webs. Additionally, high softening temperature thermoplastic fibers can be used to make up the remainder of the fibers in the first and second webs. They contain 10 to 50% by weight of thermoplastic fibers whose melting point is lower than that of the low temperature component fibers but at least 20° C. higher than that of the heat-melting adhesive. Thermoplastic fiber synthetics such as polyamide, polyester, and polyolefin have been used. For example, nylon 6 fibers having a softening point of 215° C. and other low softening polyester of polyolefin fibers have been widely used. The second surface web layer is composed of a mixture of thermoplastic fibers with non-thermoplastic fibers so as to weigh 5 to 40 g/m.sub.2 and to be overlaid on one side of the first web layer. The arrangement of fibers in the surface web layer may be unidirectional or non-directional. The weight ratio between the first web layer and the surface web layer is ideally set within the range 1:1 to 4:1. That is to say, it is desirable to raise or lower the weight ratio of the first web layer to the surface web layer to make the fabric more or less bulky. When the surface web layer is larger than the first web layer in weight ratio, not only bulk but also feel of the fabric to the touch are unfavorably affected. The web layers are laid on top of each other and heat treatment is applied thereto to bond them. The adhesive interlining is finished through the process known as spreading, printing, or spraying heat-melting adhesive on the first web layer of the non-woven fabric. The heat melting adhesive used in this process may be polyamide, polyester, and polyvinyl chloride resins in the state of powder, emulsion, paste, or solution. Conventional thermal bonding fibers which have melting points lower than the fibers to be bonded are suitable as bonding fibers. Thus, for example, appropriate fibers are obtained from "Perlon" mixed with polyester fibers or nylon-66 fibers. Polyethylene-terephthalate fibers can be bonded with good results to copolyester fibers. Preferably, however, bicomponent fibers such as core-jacket fibers of nylon 6/nylon 66 are used. Also, "side-by-side fibers" are highly suitable. In addition nylon-66/nylon-6 bicomponent fibers, fibers of polyethylene terephthalate/polybutylene terephthalate or polyethylene terephthalate/copolyester are preferred and these fibers may be of the core-jacket or the "side-by-side" type. Other bicomponent fibers are suitable provided they are composed of two components with different melting points.

All synthetic fibers with a melting point higher than the bonding fibers are suitable as cofibers forming the web of the non-woven fabric, especially polyamide 66 and polyethylene terephthalate. For some purposes, it is desirable to admix cellulose wool, cotton or wool. It is preferable to produce a non-woven fabric of the invention wherein the fibers are laid in a random or crosswise direction. Also, a lengthwise orientation of the fibers can be used as well as combinations of random, crosswise and lengthwise.

The multilayer non-woven fabric is coated with the thermal adhesive, the pattern of which can be adapted to the respective application; for instance, dot coating can be used. Suitable thermal adhesives include the customary products such as terpolyamides with a melting range around 120° C. or copolyesters or low-density polyethylene. The adhesive must always be applied on that side which has the lower or no content of thermal bonding fibers. When the material is formed into a filter bag, the adhesive-coated side will be on the inside.

Figure 2:
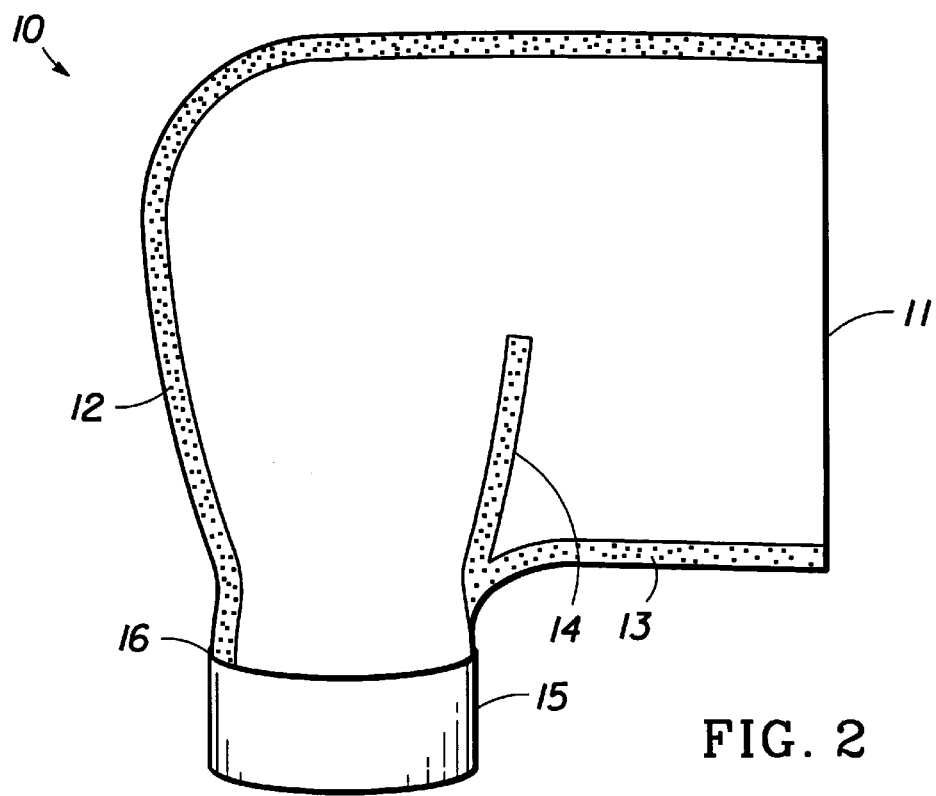
FIG. 2 is a side view of a second embodiment of the filter bag of the present invention.

FIG. 2 shows a filter bag 10 made for mounting on a different type of pool filter. The filter bag 1 is formed from a pre-cut, pre-shaped length of porous, water-permeable, non-woven material which is coated with a heat-melting adhesive. The length of material is folded upon itself at fold 11, and the upper margins 12 and the lower margin 13 are aligned. Heat is applied to upper margins 12 and lower margins 13, thereby melting the heat-melting adhesive and bonding the margins 12,13, to create "seams". The mounting collar 15 is generally formed by enclosing the lower portion 16 of the filter bag 10 between two circular pieces of plastic which snap together. A dividing seam 14 can be formed by heat fusing, if desirable.

Figure 3:
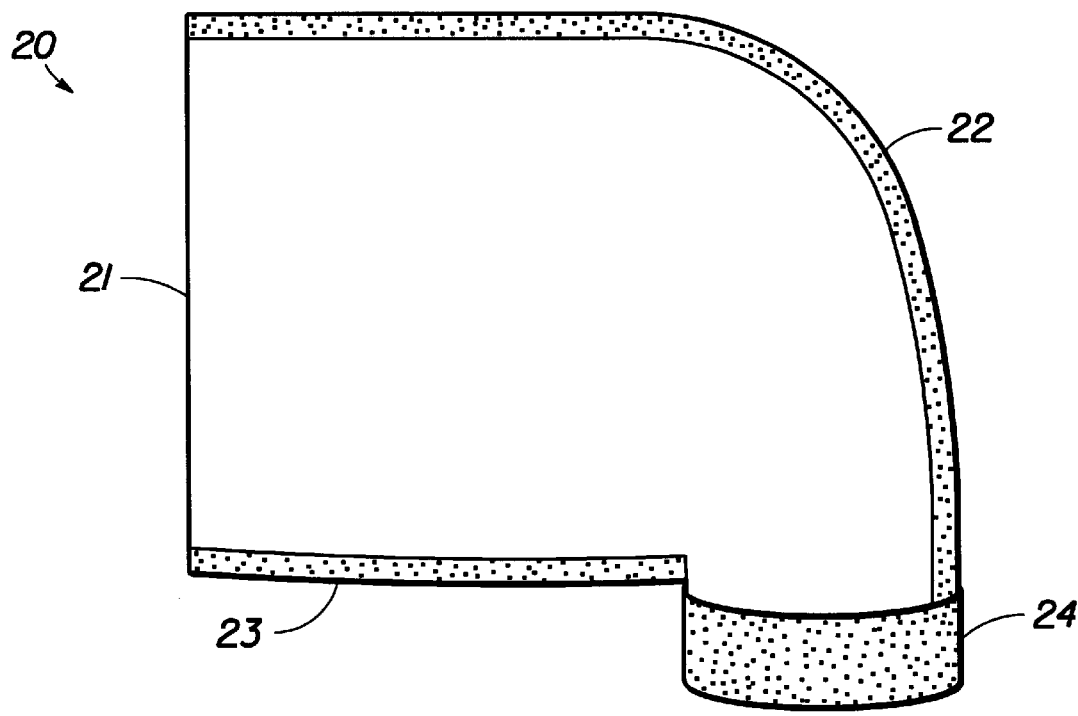
FIG. 3 is a side view of a third embodiment of the filter bag of the present invention.

In FIG. 3, a filter bag 20 is formed from a pre-cut, pre-shaped width of porous, water-permeable, non-woven material which is coated with a heat-melting adhesive. The width of material is folded upon itself at fold 21, and the upper margins 22 and the lower margins 23 are aligned. Heat is applied to the upper margins 22 and the lower margins 23, thereby melting the heat-melting adhesive and bonding the margins 22 and 23 to create "seams". The bottom margin 23 has been turned under and fused onto itself to form a stiff, circular collar 24 for mounting onto a pool filter (not shown).

Figure 4:
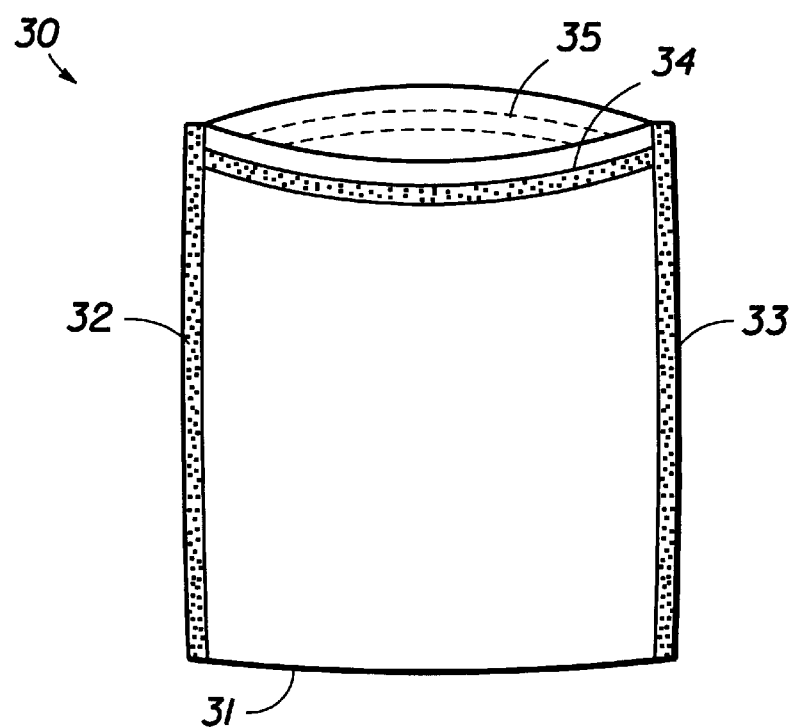
FIG. 4 is a side perspective view of a filter bag for a manual pool cleaner.

FIG. 4 shows a filter bag 30 for use with a manual pool filter. It is made from porous, water-permeable, non-woven material which is coated with a heat-melting adhesive. A length of material is folded upon itself at fold 31, and the first side margins 32 and the second side margins 33 are aligned. Heat is applied to the first side margins 32 and the second side margins 33, thereby melting the heat-melting adhesive and bonding the margins 32, 33 to create "seams". The upper edge is folded and bonded at 34 to form an opening 35 through which a string is passed, which can be drawn up. The opening of the filter bag 30 is mounted onto the nozzle of a manual pool filter, and the string is drawn up, pulled tight, and tied.

I claim:

1. A method of filtering the discharged flow of water from a pool cleaner assembly with a discharge port, said method comprising:

selecting a water-permeable nonwoven fabric having a first face and a second face, said fabric composed of fibers collected into a web and bonded to each other with compound thermoplastic adhesive fibers, the first face having a coating of heat-melting adhesive;

forming a filter bag from said fabric; and mounting said filter bag onto the pool cleaner assembly.

2. The method of claim 1, wherein said nonwoven fabric has two layers.

3. The method of claim 1, wherein the nonwoven fabric is PELLON®, a nonwoven fabric having a surface coated with heat-melting adhesive.

4. The method of claim 1 wherein said filter bag has at least one seam and the step of forming the filter bag comprises heat-fusing each seam.

5. The method of claim 1, wherein said pool cleaner assembly is selected from automatic pool cleaner assemblies and manual pool cleaner assemblies.

6. In a pool water filtering assembly, the combination with said assembly of a disposable filter bag having as its method of construction a water-permeable nonwoven fabric having a first face and a second face, said fabric composed of fibers collected into a web and bonded to each other with compound thermoplastic adhesive fibers, the first face having a coating of heat-melting adhesive.

7. The disposable filter bag of claim 6 wherein said nonwoven fabric has two layers.

8. The filter bag of claim 7, wherein said nonwoven fabric is PELLON®, a nonwoven fabric having a surface coated with heat-melting adhesive.

9. The filter bag of claim 6, wherein said filter bag has at least one seam which is heat-fused.

10. The filter bag of claim 6, wherein said pool water filtering assembly is selected from automatic pool water filtering assemblies and manual pool water filtering assemblies.

* * * * *